United States Patent Office 3,100,784
Patented Aug. 13, 1963

3,100,784
METHOD OF PRODUCING POLYMERS OF LINOLENIC ACID
Charles G. Goebel, Cincinnati, Ohio, assignor to Emery Industries, Inc., Cincinnati, Ohio, a corporation of Ohio
No Drawing. Filed June 25, 1962, Ser. No. 205,080
3 Claims. (Cl. 260—407)

This invention relates to a method for the polymerization of linolenic acid and of unsaturated fatty acid mixtures such as those recovered from linseed oil which are relatively rich in linolenic acid.

In polymerization reactions of the type with which this invention is concerned, unsaturated fatty acids, essentially of the $C_{18}$ variety, are converted into polycarboxylic acids containing two, three or even more of the $C_{18}$ acid units. The $C_{36}$ dicarboxylic acid polymer is normally referred to as dimer acid and the $C_{54}$ tricarboxylic acid as trimer acid. Two principal methods for effecting such polymerization of fatty acids are known. In one the acid starting materials are heated to temperatures above 260° C. in the presence of steam at pressures above about 40 p.s.i. until the desired polymerization of fatty acids has taken place, this method being effective with polyunsaturated fatty acids. This "thermal" method of polymerization is described in U.S. Patent No. 2,482,761.

The other polymerization method, which involves the use of water and a clay catalyst, forms the subject of U.S. Patents Nos. 2,793,219, 2,793,220 and 2,955,121. When conducting polymerization reactions by this catalytic method it is possible to polymerize both mono- as well as polyunsaturated fatty acids. The reaction is effected by heating the fatty starting material at temperatures of from about 180 to 260° C. for a period of at least one-half hour in the presence of water and a surface-active crystalline clay mineral. The reaction is normally conducted under elevated (steam) pressure in an autoclave.

Of the two methods, that involving the use of clay is the more efficient with many feed stocks (e.g., tall oil or soya fatty acid) inasmuch as it normally gives polymer yields of approximately 60 to 65% of acid polymer. The thermal method, on the other hand, gives yields ranging from about 40 to 50%, the higher yields within said range being obtained principally with stocks such as linseed fatty acids which are rich in the triply unsaturated, linolenic acid. However, for some unknown reason the catalytic method is no more efficient than the thermal method when polymerizing linseed fatty acids or other unsaturated fatty acid mixtures which contain a significant portion (i.e., at least 25% by weight) of linoleic acid. It is an object of this invention to provide a method which will afford the usual high yield of acid polymer instead of that presently associated therewith, when polymerizing linolenic acid-rich fatty materials.

Fatty acid polymers of the type referred to above find use in a wide variety of industrial applications, a particularly important usage being in the field of epoxy resins. The fatty acid polymers react with the epoxy group of the resin to form an ester linkage, thus curing the resin to form a product which has good tensile strength as well as a measure of flexibility and elasticity. Howver, when linoleic acid-rich feeds are polymerized by the thermal process, the resulting polymer, when thereafter employed in the curing of an epoxy resin, gives a product having an undesirable low tensile strength and an unsatisfactory degree of flexibility. Similar products prepared using the clay catalytic method also give cured epoxy resins having relatively poor elongation characteristics, though their tensile strength is good. In view of these facts it is a further object of this invention to provide a method of polymerizing fatty acid products rich in linolenic acid which will provide a polymer capable of curing epoxy resins to form a product having good tensile strength and flexibility.

It has been found that the foregoing and other objects of this invention can be accomplished by subjecting the linolenic acid-rich starting material to a sequential processing treatment whereby the acid is first subjected to a thermal polymerization treatment (preferably one of a mild variety) with the intermediate product so obtained then being given a conventional clay catalytic treatment. By using this sequence of polymerization steps it is possible to polymerize linseed fatty acids and others rich in linolenic acid in yields of approximately 60 to 65%. At the same time, a produce is obtained which is found to impart excellent strength and flexibility characteristics to the resulting product, when employed in the curing of epoxy resins.

The process of this invention finds utility with a variety of unsaturated fatty acid mixtures which contain at least 25% of linolenic acid, the balance of the composition being made up of other unsaturated (usually $C_{18}$) fatty acids, together with from about 10 to 20% of the saturated fatty acids normally associated therewith. However, the invention is of particular utility when starting with fatty acid mixtures obtained on the pressure splitting of linseed oil. Accordingly, for convenience of description the invention will be hereinafter described in terms of a polymerization process wherein linseed fatty acids (crude or distilled) are employed as the starting material either alone or in admixture with mixtures of other unsaturated fatty acids such as those obtained from soya oil, tall oil or the like. It may be noted that linseed acids conventionally contain from about 45 to 50% of linolenic acid.

According to the invention, the linseed fatty acids are first subjected to a thermal polymerization step of the type described in U.S. Patent No. 2,482,761. This step may conveniently be carried out by charging the acids into an autoclave along with a small amount of water, e.g., 1 to 5%. The vessel is then closed and heated to about 110–120° C., at which point it is vented to remove the air. Heating is then continued until the desired temperature and steam pressure levels are reached.

In conducting a conventional thermal polymerization operation, the contents of the vessel are maintained at a temperature of about 330–340° C. for 3 or 4 hours while regulating the pressure in the vessel so as to maintain the same at a 400–550 p.s.i. level during the heating period. This same practice can be followed in carrying out the initial polymerization step of this invention. However, improved results are obtained (particularly as regards the strength of epoxy resins cured with the acid polymer) by effecting the thermal polymerization step under somewhat milder conditions such as give a polymer yield amounting to about 40 to 85% of that otherwise obtained by the more rigorous treatment referred to above. Thus, while heating linseed acids at 340° C. for 4 hours at 500 p.s.i. steam pressure gives a polymer yield of about 50% (after stripping off monomer acids and other lower boiling products by heating the reaction mixture to 290° C. at 1–2 mm. Hg abs. pressure), this yield is reduced to about 41% by heating at 320° C. for 1 hour at 340 p.s.i. steam pressure, to 37% by heating at 300° C. for 1 hour at 300 p.s.i. steam pressure, and to 22% by heating at 290° C. for ½ hour at 300 p.s.i. steam pressure. Thus, in the preferred practice of this invention, the first, or thermal step can be conveniently carried out by heating the feed acids at 290–320° C. for 0.5–1 hour at steam pressures above about 200 p.s.i. The precise conditions to be observed for optimum results with a particular feed stock can readily be determined by routine experiment.

The whole, polymer-containing product formed by the thermal processing is next heated at temperatures of from about 180 to 260° C. for a period of at least ½ hour in the presence of water and a crystalline clay mineral. In carrying out this step, a suitable reaction vessel is changed with the acids to be polymerized, a clay mineral and water, the water being present as a component of the clay in some instances. The vessel is then heated to polymerization temperatures, preferably under elevated pressure, to retain in the reaction mixture at least a portion of the water present in the system. The clay minerals which may be used in carrying out this step are the commercially abundant, crystalline, surface active clay minerals such as montmorillonite, hectorite, halloysite, attapulgite and sepiolite. The commercial montmorillonite-rich bentonites may also be used. In general, clay minerals of the montmorillonite type constitute a preferred class for use in the present invention. The amount of clay mineral employed in the reaction mixture may range from about 1 to 20% of the weight of the reactants, though from a practical operating standpoint, a preferred range is from 2 to 10%.

The amount of water incorporated in the reaction mixture along with the clay usually ranges from about 0.5 to 5% in terms of the weight of reactants presnt, though good results may be obtained with somewhat lesser amounts, particularly if the free space in the vessel is kept to a minimum. In some cases the water content of the clay itself may be sufficient to promote the reaction. As a conventional practice, water is maintained in the reaction mixture, as the same is brought to operating temperatures and maintained thereat, by closing the vessel and allowing steam pressure to build up as described in the examples given below. However, other appropriate means, as a reflux condenser or the like, may be employed to maintain the water content of the reaction mixture at an operable level.

If desired, the clay mineral-catalyzed reaction step may also be conducted in the presence of a small amount of an alkali material (e.g., alkali metal or alkaline earth metal oxides, hydroxides or carbonates), the alkali being added either as a separate component, as a component of the clay (certain alkaline clays containing available alkali), or in the form of a fatty acid soap. This manner of effecting acid polymerization is described in U.S. Patent No. 2,955,121. The amount of alkali employed may vary over a relatively wide range, i.e., from extremely small amounts (of the order of 0.1% or even less in terms of the weight of clay mineral present) to those as large as 10 or 20%.

The step of treating in the presence of clay mineral may be performed at temperatures ranging from about 180 to 260° C. A practical and preferred temperature range is from about 220 to 250° C. A satisfactory degree of product improvement occurs within a reaction period of from about 2 to 6 hours under these preferred temperature conditions, the recommended practice being to continue the heating until the acid number of the product reaches a relatively high and stable level. In general, the use of relatively low reaction temperatures necessitates use of correspondingly longer reaction times, and vice versa. However, the use of unduly high temperatures, while permitting of shorter reaction times, is to be avoided insofar as possible since it may lead to degradation of product.

Once the reaction has been completed, the charge is cooled and (in runs operated at elevated pressures) the pressure is released to permit flashing of the water. The system may then be acidulated with phosphoric, sulphuric, oxalic or other acid adapted to convert any soap present therein to free acid and a substantially fatty acid-insoluble soap. Whether or not the acidulation step is practiced, the product is preferably filtered or otherwise treated to remove the clay mineral and any other solid materials present. The filtrate is then subjected to a conventional vacuum distillation to remove the non-polymerized portion as a distillate, leaving the desired acid polymer fraction as the residue.

The following examples are illustrative of the invention in various of its embodiments.

EXAMPLE 1

*Run A.*—Pressure split linseed acids (undistilled) were given a mild thermal polymerization treatment in an autoclave by heating the acids, along with about 1 to 2% of water, at 300° C. for one hour under 300 p.s.i. steam pressure. At the end of this heating period the product was then cooled and then poured from the autoclave over Dry Ice to provide a protective atmosphere of $CO_2$ over the intermediate product pending its transfer to the catalytic reactor vessel. A sample of the product so produced, when heated at 290° C. under 1–2 mm. Hg abs. pressure to distill off monomeric acids, was found to contain 37.2% of polymer.

The thermally polymerized product was then placed in an autoclave along with about 3% water and 4% of a naturally acidic montmorillonite clay. The resulting reaction mixture was then heated in the closed autoclave to 230° C., the steam in the vessel being vented at this point until a pressure level of 90 p.s.i. was reached. The closed vessel was then heated to 240° C. and maintained at this temperature for 4 hours under a steam pressure of 100–110 p.s.i. The product was then cooled to 150° C. and treated in the autoclave with 0.1% of 75% $H_3PO_4$. The product was removed, stirred with 0.2% additional $H_3PO_4$, filtered and then distilled under the conditions referred to above (290° C. in vacuo) to remove monomeric acids. There remained a polymeric residue in a yield of 63.1%, which product had a neutral equivalent of 305.

*Runs B and C.*—In companion operations, a pressure split linseed fatty acid mixture was given only a conventional thermal polymerization treatment in the one case (run B) and a clay catalyst polymerization treatment in the other (run C). The respective thermal and catalytic treatments were conducted in the same general fashion as were the corresponding operations in run A except that in the thermal run the fatty acid was heated at 340° for 4 hours under a steam pressure of 500–550 p.s.i. This treatment provided a polymeric acid yield of 50.8%, said product having a neutral equivalent 315. The catalytic operation (run C) was conducted by heating the acids at 240° C. for 4 hours at a steam pressure of 110–130 p.s.i. in the presence of 2% water and 6% of an acid-activated montmorillonite clay (Grade 20 of the Filtrol Corporation). This method provided a polymer yield of 51.6%, the product having a neutral equivalent of 313.

EXAMPLE 2

A series of runs was made to evaluate the properties of epon resins formed by the reaction, in stoichiometric proportions, of an epoxy compound with the polymers produced in accordance with runs A, B and C as described above. In each case the polymer was reacted with the epoxy compound (diglycidyl ether of bisphenol A) in the presence of dimethyl benzylamine as a catalyst. In forming the resin, the mixture was slowly heated to 100° C. and was then rapidly brought to 110–120° C. where it was held for 1 to 3 minutes before being poured into a mold where it was allowed to cure at 125° C. for 4 hours. Samples were then cut from the cured product and subjected to standard test methods to determine tensile strength as well as elongation at 70° F. The results obtained are expressed in the following table.

Table

|  | Tensile strength, p.s.i. | Elongation, percent |
|---|---|---|
| Run A | 2,265 | 320 |
| Run B | 1,415 | 225 |
| Run C | 2,515 | 250 |

From the data presented in the foregoing table it will be seen that the product formed using the run A polymer had elongation characteristics which were far superior to those of the other two products. The tensile strength of the run A material was also very good.

In Example 1 presented above the thermal and the catalytic polymerization steps were carried out in separate vessels. However, in conducting the process on a commercial scale a single reaction vessel could be employed, in which case the necessary amount of clay and any further amounts of water to be added (either as present in the clay or otherwise) would be added to the contents of the vessel at the conclusion of the thermal step once said contents have been brought to the proper temperature.

I claim:

1. A process for polymerizing fatty acid mixtures containing at least 25% linolenic acid, which comprises first subjecting said mixture to a thermal polymerization treatment at temperatures of from about 260 to 340° C. at steam pressures above 40 p.s.i. until substantial polymerization is obtained, and then subjecting the intermediate reaction product so produced to a catalytic polymerization treatment conducted in the continuing presence of water and a crystalline clay mineral at temperatures of from about 180 to 260° C. for at least ½ hour.

2. A process for polymerizing fatty acid mixtures containing at least 25% linolenic acid, which comprises first subjecting said mixture to a thermal polymerization treatment at temperatures of from about 260 to 340° C. at steam pressures above 40 p.s.i. until substantial polymerization is obtained, subjecting the intermediate reaction product so produced to a catalytic polymerization treatment conducted in the continuing presence of water and a crystalline clay mineral at temperatures of from about 180 to 260° C. for at least ½ hour, removing the clay mineral from the resulting reaction product and recovering the desired polymer therefrom by distilling off the monomer portion under vacuo.

3. A process for polymerizing linseed fatty acids which comprises first subjecting said acids to a thermal polymerization treatment at temperatures of from about 290 to 320° C. at steam pressures above about 200 p.s.i. for about ½ to 1 hour, subjecting the intermediate reaction product so produced to a catalytic polymerization treatment conducted in the continuing presence of water and a montmorillonite clay mineral at temperatures of from 180 to 260° C. for at least ½ hour, removing the clay mineral from the resulting reaction product and recovering an acid polymer therefrom by distilling off the monomer portion under vacuo.

No references cited.